US006381081B1

(12) United States Patent
Ford

(10) Patent No.: US 6,381,081 B1
(45) Date of Patent: Apr. 30, 2002

(54) FLEXURE-RING FOR CENTERING A CONCAVE LENS IN A BORE OF A HOUSING FOR AN OPTICAL SYSTEM

(75) Inventor: Virginia G. Ford, La Canada, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/770,798

(22) Filed: Jan. 19, 2001

(51) Int. Cl.[7] ................................................. G02B 7/02
(52) U.S. Cl. ........................ 359/819; 359/820; 359/830
(58) Field of Search ................................. 359/811, 819, 359/820, 822, 823, 827, 830; 353/100; 396/529

(56) References Cited

U.S. PATENT DOCUMENTS

| 3,671,108 A | 6/1972 | Kilgus |
| 3,763,543 A | 10/1973 | Strauch et al. |
| 3,904,276 A | 9/1975 | Whitaker et al. |
| 4,725,126 A | 2/1988 | Siga et al. |
| 4,778,252 A | 10/1988 | Filho |
| 4,812,015 A | 3/1989 | Iizuka et al. |
| 5,024,509 A | 6/1991 | Kurihara |
| 5,053,794 A | 10/1991 | Benz |
| 5,117,311 A | 5/1992 | Nomura |
| 5,428,482 A | 6/1995 | Bruning et al. |
| 5,493,452 A * | 2/1996 | Hoshino et al. ............. 359/819 |
| 5,523,893 A * | 6/1996 | Haas .......................... 359/820 |
| 5,808,817 A * | 9/1998 | Miyamoto et al. .......... 359/819 |
| 6,239,924 B1 * | 5/2001 | Watson et al. .............. 359/819 |

* cited by examiner

Primary Examiner—Georgia Epps
Assistant Examiner—Saeed Seyrafi
(74) Attorney, Agent, or Firm—John H. Kusmiss

(57) ABSTRACT

A flexure-ring is provided for centering a lens in a bore of a housing with 3N lens contacting stubs, where N is an integer equal to or greater than one. The stubs are formed by increasing the inside diameter of the ring made to fit tightly around a lens except at 3N locations for the aforesaid stubs, and said ring having an outside diameter made to fit tightly inside the housing bore locations. Behind each stub, a segment of the ring is removed down to a chord perpendicular to a ring diameter passing through the center of each stub. That chord is selected to have a length greater than the lens contacting surface of the stub, thereby to produce a reduced cross section of the ring on both sides of the stub to serve as flexures in relieving stresses due to different coefficients of thermal expansion of the three parts involved due to changes in temperature while in use.

4 Claims, 2 Drawing Sheets

FLEXURE-RING FOR CENTERING A CONCAVE LENS IN A BORE OF A HOUSING FOR AN OPTICAL SYSTEM

ORIGIN OF THE INVENTION

The invention described herein was made in the performance of work under a NASA contract, and is subject to provisions of Public Law 96-517 (35 USC 202) in which the contractor has elected not to retain title.

FIELD OF THE INVENTION

The invention pertains to a flexure-ring for centering a concave lens in a bore of a housing, such as a barrel of a telescope, particularly a plurality of lenses to be coaxially stacked in tandem, such as in a multilens camera or other precision optical device.

BACKGROUND OF THE INVENTION

In a multilens system, it is common practice to coaxially stack lenses in tandem in the bore of a housing. Precision centering of the lenses is sometimes simply accomplished with spacing rings and without centering rings by matching the Coefficient of Thermal Expansion (CTE) of the lens material with a low CTE of the housing material. This, along with tight machining tolerances for a close fit to a bore, controls the lens to be axially centered in the bore without undue stress on the lens during nominal thermal excursions. However, in some instances, a low CTE housing material may not be suited to other needs of the lens assembly, such as when temporal stability and axial focus is important during anticipated significant temperature excursions, such as during outer space missions. In such cases, a complex arrangement is required to solve the thermal expansion problems resulting from such large temperature excursions, such as using precision control of temperature for the lens assembly which has its own problems.

To remedy this, lenses can be mounted in a housing with high CTE if the lenses are centered by other means. For a convex lens 10 shown in FIG. 1, centering can be accomplished by using prior-art, tangent-contact rings 11 and 12 fabricated of the same material as the housing 13 with a precision fit to the bore in the housing. Such tangent-contact rings are able to center a convex lens with tight tolerances and without constraining the lens radially, but they cannot be used to center concave lenses because of the lack of outwardly curved surfaces on both sides of the lens for tangent contact of the rings with the lens.

For a concave lens 14 shown in FIG. 2, a precision circumferential-contact ring 15 that surrounds the lens can be used, but that requires not only spacing rings 16, 17 and a tight precision fit of the ring 15 to the bore of the housing 18, but also close CTE matching for the material of the ring 15 to the material of both the housing 18 and the lens 14. However, in some applications, such as in a space telescope, machining tolerances that are otherwise sufficiently tight are too loose for required centering tolerances of 0.0007". In that case, some means must be provided for relieving compression of the lens due to differences in CTE of the lens material vis-à-vis that of the housing 18 and the peripheral contact ring 15. An object of the present invention is to provide a flexure-ring for centering a lens while at the same time relieving compression due to differences in the CTE of the ring 15 and the housing 18.

Flexible plastic rings have not been used for precision centering of lenses, because such rings could not be machined clean with the precision required for tolerances of 0.0007", but it is now possible to use plastic rings due to the advent of durable elastomeric material that can be machined with that precision, such as from stock SP-1 made by E.I. DuPont de Nemours & Co. of synthetic resinous plastic, i.e., a plastic based on polyamide resin sold under the trademark Vespel. The availability of that material has made the flexure-ring of the present invention possible. However, other plastics capable of being machined clean with the requisite precision may already be or will become available. Consequently, it is not intended that the present invention be limited to the use of Vespel for the flexure-ring.

STATEMENT OF THE INVENTION

In accordance with the present invention, a flexure-ring for centering a concave lens in the bore of a housing is machined from a sheet of precision machinable plastic material with an outer diameter that has a precision fit to the inner diameter of a bore in a housing for a lens system and an inner diameter that has a precision fit to the concave lens, where the desired precision is of the order of about 0.0007". This ring is then further machined to a larger inner diameter, but leaving lens contacting stubs of equal circumferential contact extent in 3N locations spaced apart by equal angles, where N is an integer equal to or greater than 1, such as 2, 3 or greater, and additionally machining a segment off the outside of the ring behind each contacting stub down to a chord of equal length for each stub greater than about twice the lens contacting length of each stub and perpendicular to the radius of the ring passing through the center of respective stubs. This leaves a ring with 3N equally spaced lens contacting stubs, each stub connected in the ring by two identical flexures, one on each side thereof, hence the term flexure-ring. In that manner, precision flexures on both sides of each contacting stub allow the stubs to center the lens with the requisite precision under varying ambient temperature conditions while compensating for any mismatch in the CTE between the housing, lens and ring material.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3b is a sectional view of the embodiment of the invention taken on a line B—B in FIG. 3a.

DETAILED DESCRIPTION OF THE INVENTION

Figure 3A:
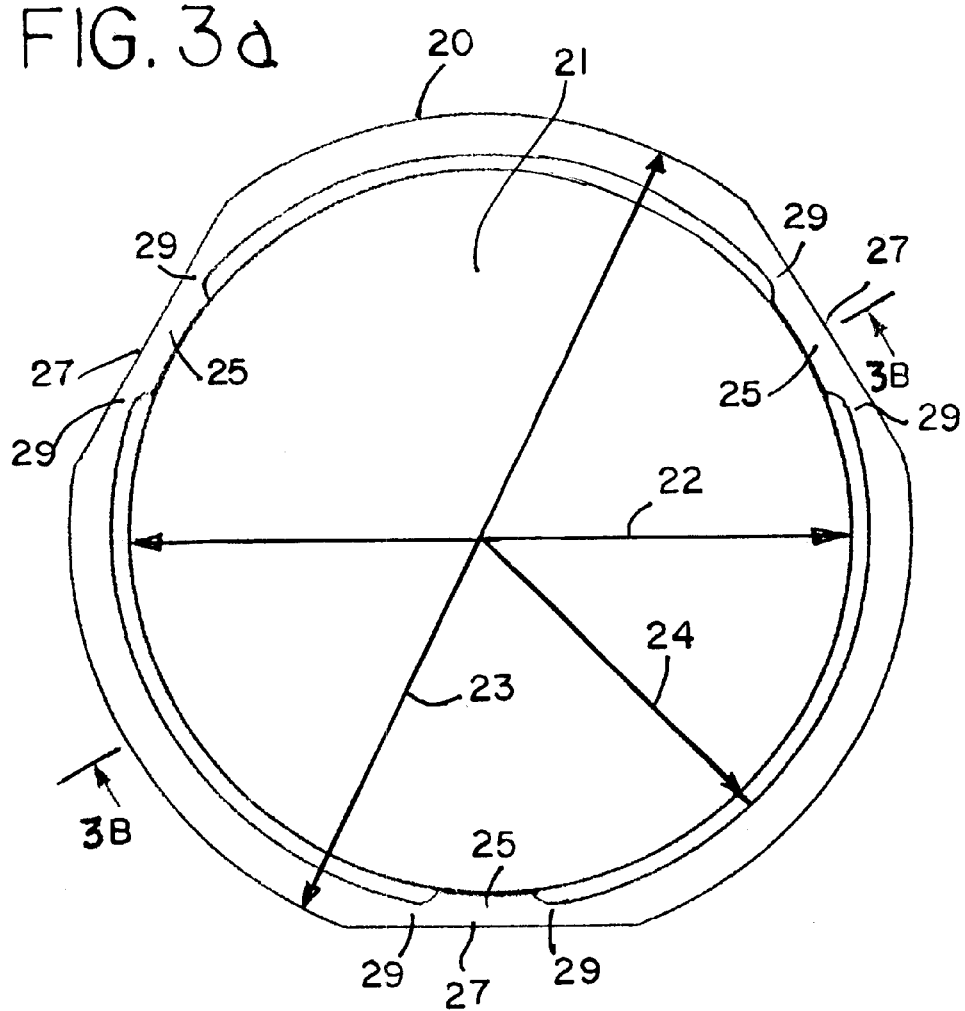
FIG. 3a is a plan view of an embodiment of the present invention comprising a flexure-ring having 3N lens contacting stubs, where N=1, spaced equally 120° apart and protruding inwardly from the inside of the ring with segments of the flexure-ring machined from the outside of the ring down to a chord of equal length for all stubs with each chord centered behind their respective contacting stubs.
Figure 3B:
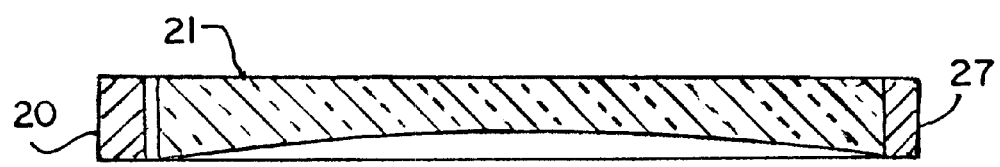

Referring to FIGS. 3a and 3b, a plastic ring 20 is provided for precision centering of a concave lens 21 of a diameter 22 by first precision machining the outer diameter 23 of the plastic ring for a tight fit in a bore of a housing (not shown) and machining with precision the inner surface of the plastic ring to a radius of half the lens diameter 22 for a tight fit of the lens in the plastic ring. This establishes the critical surface of the plastic ring that will actually do the centering of the concave lens 21 in a housing bore.

Figure 1:
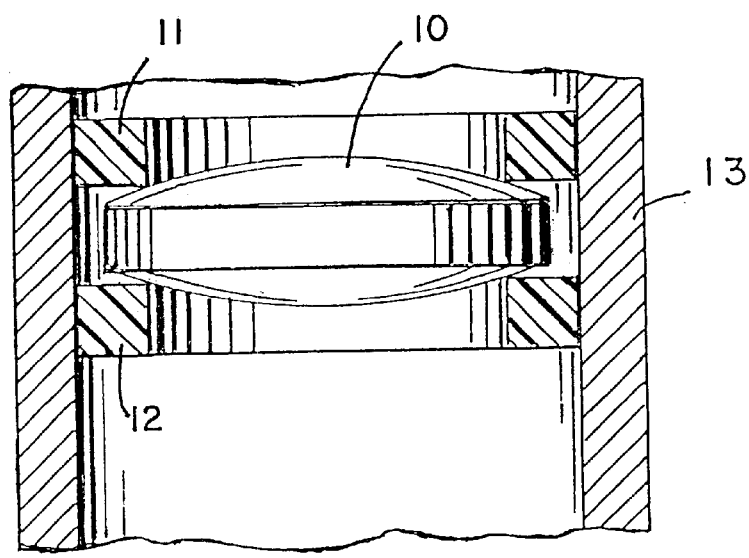
FIG. 1 illustrates the use of a prior-art, tangent-contact ring for centering a convex lens in a bore of a housing.
Figure 2:
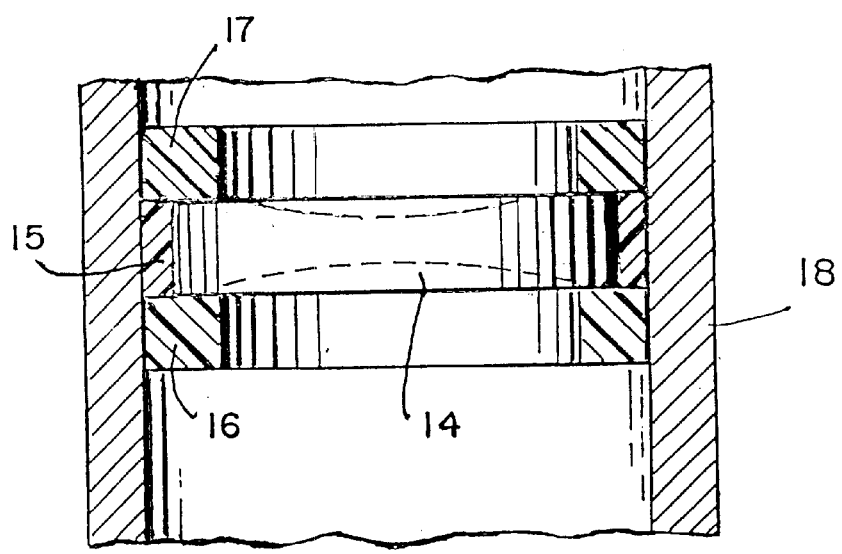
FIG. 2 illustrates the use of a prior-art, full-circumferential contact ring for centering a concave lens in a bore of a housing.

Such a plastic ring 20 machined as described thus far in the previous paragraph would not be unlike the prior-art, full-circumferential contact ring shown in FIG. 2 for centering a concave lens in a bore, but such a full plastic ring is fraught with thermal expansion problems if all three parts (housing, ring and lens) are not carefully matched in their CTE over the range of temperatures expected to be encountered when the optical system employing the lens is put into use. However, by further machining the inner surface of the ring 20 with precision, .using a numerical controlled machine set to a radius 24 greater than half the diameter 22 of the lens 21 in all but three lens contact locations spaced equally 120° apart, three stubs 25 of equal lens contacting lengths are left extending inwardly against the circumference of the lens 21. That alone will not necessarily avoid a CTE mismatch problem in centering the lens. It is necessary to also machine a segment from the outside of the ring 20 behind each of the stubs 25 down to chords 27 of equal length for all stubs greater than about twice the arc length of each lens contacting stub and perpendicular to the radius of the ring passing through the center of each stub. This leaves reduced cross-sectional portions of the ring as equal flexures 29 on both sides of each stub to complete the flexure-ring with its outer diameter in contact with a housing bore (not shown) and the lens between the three precision stubs 25 spaced 120° apart and between the flexures 29. As the stubs hold the lens centered with respect to each other, each supporting stub is relieved equally on both sides thereof by flexures 29 of equal flexing due to the machining of segments of the ring down to the chords 27.

As temperature changes, any differences in CTE of the three parts (lens, flexure-ring, and housing bore) will cause differences in expansions of the parts, which in turn produce stresses on the lens resulting in misalignment and possible damage of the lens in the bore, if the stresses were not relieved by the flexures 29 of the ring on both sides of each stub 25. The ring 20 thus functions much like the full-circumferential contact ring shown in FIG. 2, but with contact of the lens by the ring only by the stubs 25 connected to the ring by the flexures 29 on both sides of the stubs. In that manner, any difference in expansion of the parts due to differences in the CTE's is thus relieved equally by the flexures spaced equally around the ring. This assures maintaining the centering of the lens within a tolerance of about 0.0007". However, the flexure-ring of the present invention is not limited to use in just optical systems that require such a tight tolerance in centering a lens. It may be used to equal advantage in any optical system, even though such a tight tolerance in centering is not required. In other words, the motivation for this invention (tight tolerance and close matching of CTE for the parts) is not intended to be a limitation in the following claims of a flexure-ring for centering a lens in a bore.

Furthermore, although a flexure-ring has been shown and described as having 3N stubs, where N=1, spaced equally apart at 120°, there may be provided 3N stubs where N=2, namely six stubs equally spaced at 60° intervals. In that case, the flexures on each side of each stub are formed in the same manner as before. For a lens of large diameter and thus greater circumference, it may be feasible to select N equal to 3 for nine stubs equally spaced at 40° intervals. Similarly, for an even larger lens, N may be set equal to 4 to provide 12 stubs spaced at 30° intervals. Thus, the limit on number N depends only on the size of the lens. The greater the circumference of the lens, the more stubs of equal contacting length can be equally spaced with flexures on both sides of each stub.

What is claimed is:

1. A flexure-ring for centering a concave lens in a bore of a housing, said ring having an outer diameter of said flexure-ring provided for a tight fit in said bore and an inner diameter of said flexure-ring provided for a tight fit around said lens, said flexure-ring further having said inner diameter increased in all but 3N locations of equal length to provide lens contacting stubs of equal lens contacting length spaced apart equally, where N is an integer equal to or greater than one, and said flexure-ring having segments of its outside surface machined down to chords of equal length centered opposite each lens contacting stub, wherein each chord behind each stub is of equal length and greater than the lens contacting length of each stub, whereby a flexure of said ring is provided on each side of said lens contacting stub by a decreased cross-sectional area of said flexure-ring on each side of each stub, thereby to compensate between any mismatch in expansion of said housing, lens and ring due to different coefficients of thermal expansion of said housing, lens and ring material as temperature changes for precision centering of said lens in said bore.

2. A flexure-ring as defined in claim 1 wherein said flexure ring is made of plastic material.

3. A flexure-ring as defined in claim 2 wherein said plastic material is elastomeric material.

4. A flexure-ring as defined in claim 3 wherein said elastomeric material is based on polyamide resin capable of being machined clean with precision of about 0.0007".

* * * * *